United States Patent [19]

Bratt et al.

[11] Patent Number: 5,740,402
[45] Date of Patent: Apr. 14, 1998

[54] CONFLICT RESOLUTION IN INTERLEAVED MEMORY SYSTEMS WITH MULTIPLE PARALLEL ACCESSES

[75] Inventors: Joseph P. Bratt, San Jose; John Brennen, Mountain View; Peter Y. Hsu, Fremont; Joseph T. Scanlon, Sunnyvale; Man Kit Tang, Milpitas, all of Calif.; Steven J. Ciavaglia, Williston, Vt.

[73] Assignee: Silicon Graphics, Inc., Mountain View, Calif.

[21] Appl. No.: 487,240

[22] Filed: Jun. 13, 1995

Related U.S. Application Data

[63] Continuation of Ser. No. 168,827, Dec. 15, 1993, abandoned.

[51] Int. Cl.$^6$ ..................................................... G06F 12/00
[52] U.S. Cl. ........................... 395/484; 395/405; 395/454; 395/477
[58] Field of Search .................................... 395/405, 478, 395/484, 485, 496, 477, 457

[56] References Cited

U.S. PATENT DOCUMENTS

| | | | |
|---|---|---|---|
| 4,636,942 | 1/1987 | Chen et al. | 395/742 |
| 4,697,235 | 9/1987 | Motegi | 395/800 |
| 4,745,545 | 5/1988 | Schiffleger | 395/477 |
| 4,783,736 | 11/1988 | Ziegler et al. | 395/457 |
| 4,901,230 | 2/1990 | Chen et al. | 395/476 |
| 4,933,846 | 6/1990 | Humphrey et al. | 395/287 |
| 5,261,068 | 11/1993 | Gaskins et al. | 395/484 |
| 5,270,973 | 12/1993 | Guillemaud et al. | 365/189.02 |
| 5,323,489 | 6/1994 | Bird | 395/494 |

OTHER PUBLICATIONS

Hot Chips IV Symposium Stanford University, Aug. 9–11, 1992, Message from the Program Chairs, Message from the General Chair, Sunday tutorial schedule, Monday schedule, Tuesday schedule, and pp. 1.2.1–1.2.13.

Hot Chips V Symposium Stanford University, Aug. 8–10, 1993, Message from the General Chair, Message from the Program Co–Chairs, Sunday tutorial schedule, Monday schedule, Tuesday schedule, and pp. 8.1.1–8.1.9.

Hot Chips V Symposium Stanford University, Aug. 8–10, 1993, Message from the General Chair, Message from the Program Co–chairs, Sunday tutorial schedule, Monday schedule, Tuesday schedule, and pp. 1.3.1–1.3.12.

Case, B. (1992) "IBM Delivers First PowerPC Microprocessor" *Microprocessor Report The Insider's Guide to Microprocessor Hardware* vol. 6, No. 14, pp. 5–10.

Case, B. (1993) "Intel Reveals Pentium Implementation Details" *Microprocessor Report* pp. 9–17.

Case, B., et al. (1992) "DEC Enters Microprocessor Business with Alpha" *Microprocessor Report The Insider's Guide to Microprocessor Hardware* vol. 6, No. 3, pp. 5–14.

Slater, M. (1991) "Second–Generation i860 Premiers as i860XP" *Microprocessor Report The Insider's Guide to Microprocessor Hardware* vol. 5, No. 11, pp. 5–9.

*Primary Examiner*—Jack A. Lane
*Attorney, Agent, or Firm*—Sterne, Kessler, Goldstein & Fox P.L.L.C.

[57] ABSTRACT

A conflict resolution system for interleaved memories in processors capable of issuing multiple independent memory operations per cycle. The conflict resolution system includes an address bellow for temporarily storing memory requests, and cross-connect switches to variously route multiple parallel memory requests to multiple memory banks. A control logic block controls the address bellow and the cross-connect switches to reorder the sequence of memory requests to avoid conflicts. The reordering removes conflicts and increases the occurrence of alternating memory requests that can issue simultaneously.

7 Claims, 4 Drawing Sheets

CONFLICT RESOLUTION IN INTERLEAVED MEMORY SYSTEMS WITH MULTIPLE PARALLEL ACCESSES

This application is a continuation of application Ser. No. 08/168,827, filed Dec. 15, 1993, now abandoned.

BACKGROUND OF THE INVENTION

This invention relates in general to computers using interleaved memory systems, and in particular to a computer having an interleaved memory architecture with multiple simultaneous memory accesses.

In general, memory is one of the slower sub-systems in a processor. Processor performance suffers when a fast device such as the CPU must wait for a memory system to access data. One way to reduce performance degradation due to slow memory is to incorporate a cache memory into the system. Cache memories are high-speed buffers that hold copies of the most frequently accessed data in main memory. Adding a cache memory between the fast device and the slow memory reduces the effective access time of the memory system. Cache memories take advantage of the fact that programs tend to access data and code that were recently accessed or are located in nearby memory locations. Therefore, storing in the cache recently accessed data and neighboring data significantly increases the number of successful cache accesses.

Another way to increase the effective speed of accessing large memory systems is to organize the memory in an interleaved fashion. In general, an interleaved memory system divides a large memory into several independent banks in which some address bits select the bank for a memory reference and the remaining address bits select a word within the bank. An interleaved memory can be used, for example, in a pipelined architecture to increase memory throughput. Typically a memory access takes more than one cycle to complete. Thus if successive memory requests access different banks, a second bank access can be initiated before the first bank access is completed. Therefore, interleaving can increase the overall data rate. Interleaving is also utilized to increase memory access efficiency in architectures using multiple parallel processors. In such a system, if it happens that each processor uses a different bank of memory for its programs and data, then all banks can transfer data simultaneously. Another application for interleaved memories is in very long instruction word (VLIW) computers. Processors using a VLIW architecture divide one instruction into multiple fields each holding a separate operation. Therefore, it is possible that the processor may issue more than one memory operation per cycle. An interleaved memory can have separate banks service each operation in parallel.

Memory interleaving based on a similar principal is employed by superscalar computers that are capable of executing more than one instruction per cycle. In a superscalar computer that processes, for example, two instructions per cycle, it is desirable to process two independent memory accesses simultaneously. Dual port memories can be used to accomplish this task. However, larger memories with dual ports are very expensive. By dividing a single large memory into two banks that are interleaved, the available memory bandwidth can be doubled without the need for dual ports.

Such interleaving, however, introduces the potential for two simultaneous references to the same bank of the memory. Intelligent code generation by the compiler can mitigate such bank conflicts to some extent. For example, the compiler knows that references A[i] and A[i+1] will be to different banks of the memory. However, the problem arises when, for example, a subroutine with a loop references two different arrays A[i] and B[i] that are formal parameters. Because the compiler does not know what the base address of the arrays are, it cannot determine whether references A[i] and B[i] request access to the same bank. Another approach to mitigate memory bank conflicts is to increase the degree of interleaving. The probability of conflicts can be significantly reduced in, for example, an eight way or 16 way interleaved memory. However, there are cost and performance penalties associated with highly interleaved memories. For example a 32-bit processor having an eight way interleaved memory requires 32-bit buses distributing each address to eight different banks of the memory. Using commercially available memory chips, such as static random access memories (SRAMs), this will require multiple chips and a complex address distribution scheme. The scheme will require further buffering which slows down the memory.

There is, therefore, a need for efficient conflict resolution for interleaved memory systems used in processors that are capable of processing more than one memory operation at the same time.

SUMMARY OF THE INVENTION

The present invention offers a highly efficient conflict resolution system for interleaved memories in processors requiring multiple parallel memory accesses. The conflict resolution system includes minimal hardware to assist the processor compiler in reordering the address mix to avoid conflicts.

In one embodiment, the present invention provides a conflict resolution system for an interleaved memory with at least two banks in a processor capable of issuing more than one memory operation per cycle. The conflict resolution system includes a cross-connect switch for routing a memory request to one of at least two paths corresponding to the two banks. The system further includes at least one address register (or bellow) for temporarily storing a selected memory request to reorder the sequence of memory requests so as to improve the occurrence of alternating memory bank requests.

A better understanding of the nature and advantages of the conflict resolution system of the present invention may be had with reference to the detailed description and the drawings below.

DESCRIPTION OF SPECIFIC EMBODIMENTS

Figure 1:
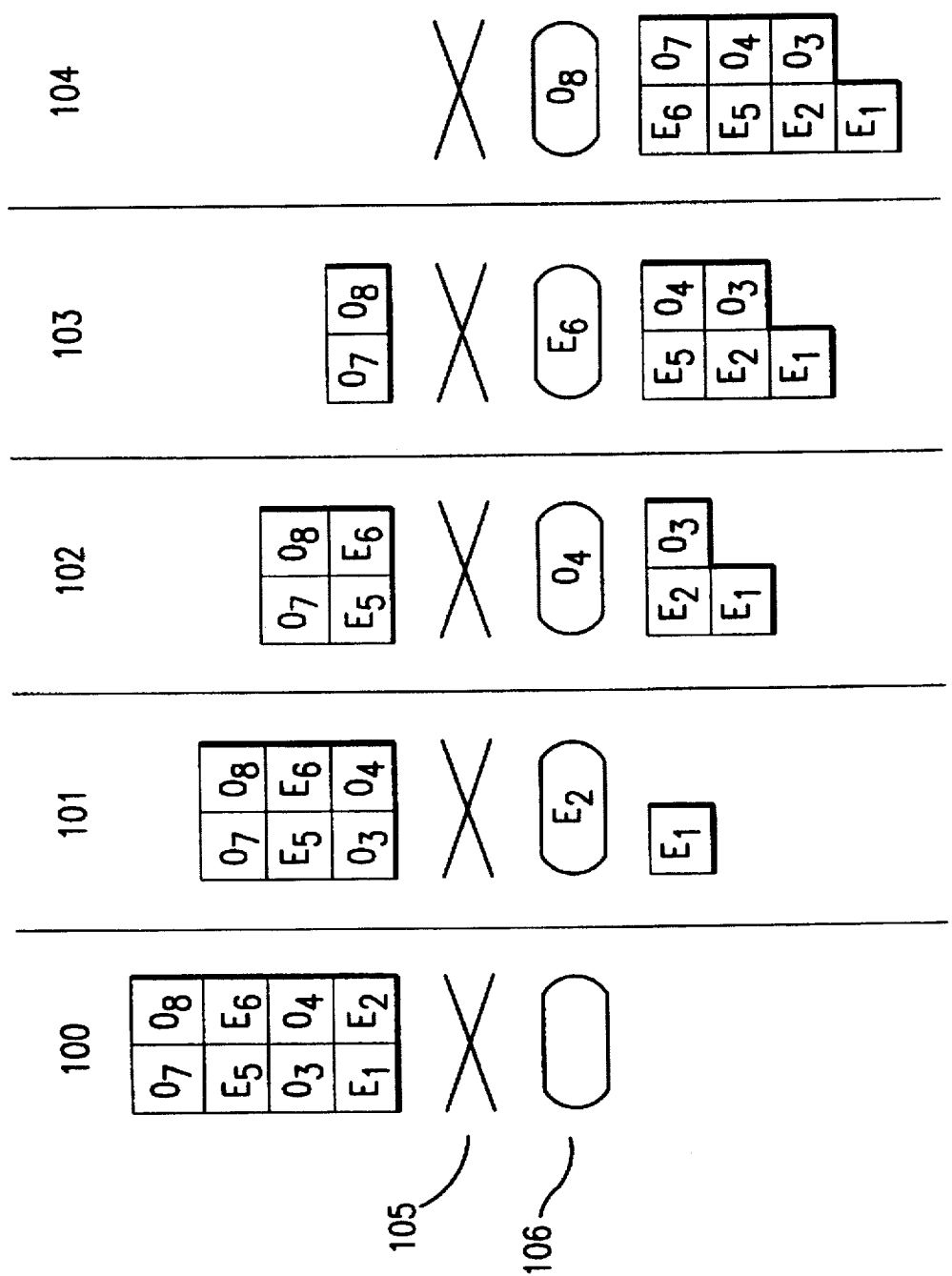
FIG. 1 illustrates the principle of operation of the present invention for an exemplary one-deep queue that helps mitigate conflicts for a two-way interleaved memory in a superscalar computer.

FIG. 1 illustrates the principle of operation for an exemplary one-deep queue that helps mitigate conflicts for a two-way interleaved memory in a superscalar computer. In this example, the superscalar computer is pipelined and is capable of processing two independent memory requests simultaneously. The memory is divided into two banks; an even and an odd bank. Given a set of eight consecutive memory requests, the ideal sequence would be alternating even and odd requests: {E1, O2, E3, O4, E5, O6, E7, O8}. Another sequence that would not present a conflict would be {E1, O2, O3, E4, E5, O6, O7, E8}. In either of these cases, pairing the requests in the order they appear in the sequence would avoid a conflict. The problem arises when the sequence is as follows: {E1, E2, O3, O4, E5, E6, O7, O8}. Without a conflict resolution scheme, the interleaved memory would only be able to process one half of a pair of requests per cycle. The pipeline would be stalled every other cycle, thus the machine would run at 50% efficiency. In fact, to maintain compatibility with, for example, 32-bit machines that have sequential memory access, this particular sequence would be the most commonly occurring sequence in a 64-bit machine. This is also the sequence that is analyzed in FIG. 1.

Referring to FIG. 1, the first cycle 100 shows the memory request sequence, a crossbar 105, and an empty address bellow 106. In the following cycle 101, a single memory request E1 is issued down the even path and memory request E2 is stored in the bellow 106. At this point E2 can be paired with the next occurring odd memory request O3. So in the next cycle 102, memory accesses E2 and O3 are issued simultaneously, and O4 is moved to the bellow 106. In the next cycle 103, O4 is paired with E5 and both are issued simultaneously, while E6 enters the bellow 106o This pattern continues until O8 is singularly issued down the odd path° The result is that for a large string of memory requests that exhibit this most commonly occurring sequence, the efficiency is improved from 50% to almost 100% Of course, the application of this conflict resolution scheme need not be limited to a two-way interleaved memory. Combining the address bellow with a memory having higher degrees of interleaving improves conflict resolution efficiency even further.

An example of an application for the conflict resolution mechanism of the present invention can be found in the cache memory of superscalar computers. One example of a superscalar computer with an interleaved cache memory is the TFP microprocessor developed by Silicon Graphics, Inc. (SGI) of Mountain View, Calif. The interleaved cache memory of the SGI superscalar microprocessor is used herein as an illustrative example of an implementation for the conflict resolution mechanism of the present invention. The TFP microprocessor pipeline architecture includes three major pipelines: an integer pipeline, a floating point pipeline, and a global cache pipeline. The global cache is a large multi-megabyte memory that directly feeds the floating point unit which processes large arrays of data. The TFP also includes a second smaller cache dedicated to the integer unit. The distribution of code and data in memory, and the overall memory architecture for the TFP microprocessor is described in detail in commonly-owned, co-pending patent application, Ser. No. 08/168,832, which is hereby incorporated by reference in its entirety for all purposes.

Figure 2:
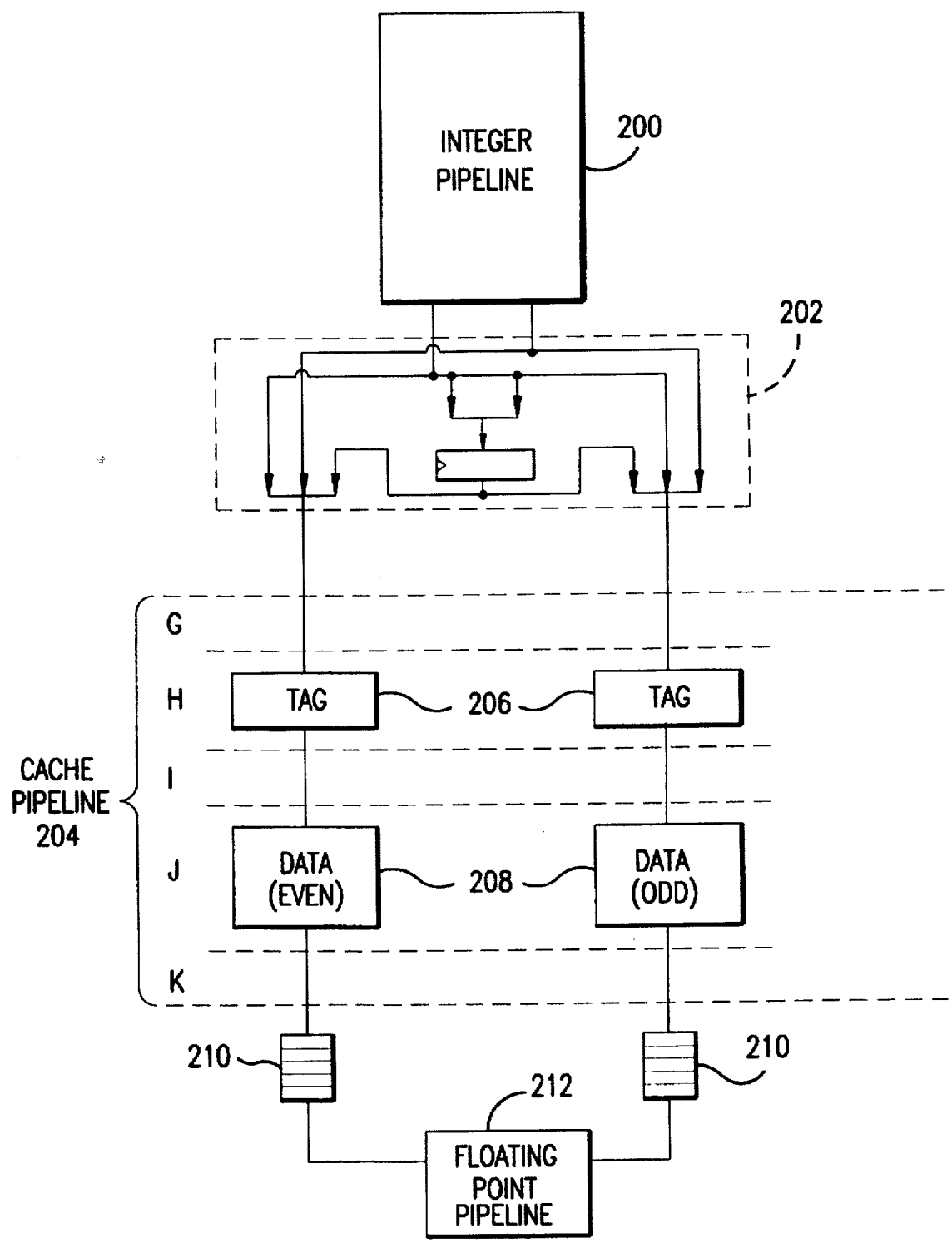
FIG. 2 shows a high level diagram of pipelined interleaved cache memory placed between an integer unit and a floating point unit of an exemplary superscalar microprocessor.

FIG. 2 shows a high level diagram of the cache pipeline placed between the integer unit and the floating point unit of the TFP microprocessor. Prior to entering the cache pipeline 204, memory requests go through the integer pipeline 200 and the address bellow logic 202. The cache is two-way interleaved (even and odd) to support two, for example, 64-bit load or store instructions per cycle. The cache pipeline 204 has five stages: G, H, I, J, and K that process two independent memory requests. The three stages G, H, and I correspond to the operation of the address tag memory 206 for the cache. The address tag memory 206 stores data representing the physical addresses of the data in main memory and some validity information. Stages I, J, and K process the two memory requests through the data cache 208 which stores the actual data in case of a cache hit. The accessed data is then loaded into data load queues 210 in the floating point unit which includes the floating point pipeline 212.

Figure 3:
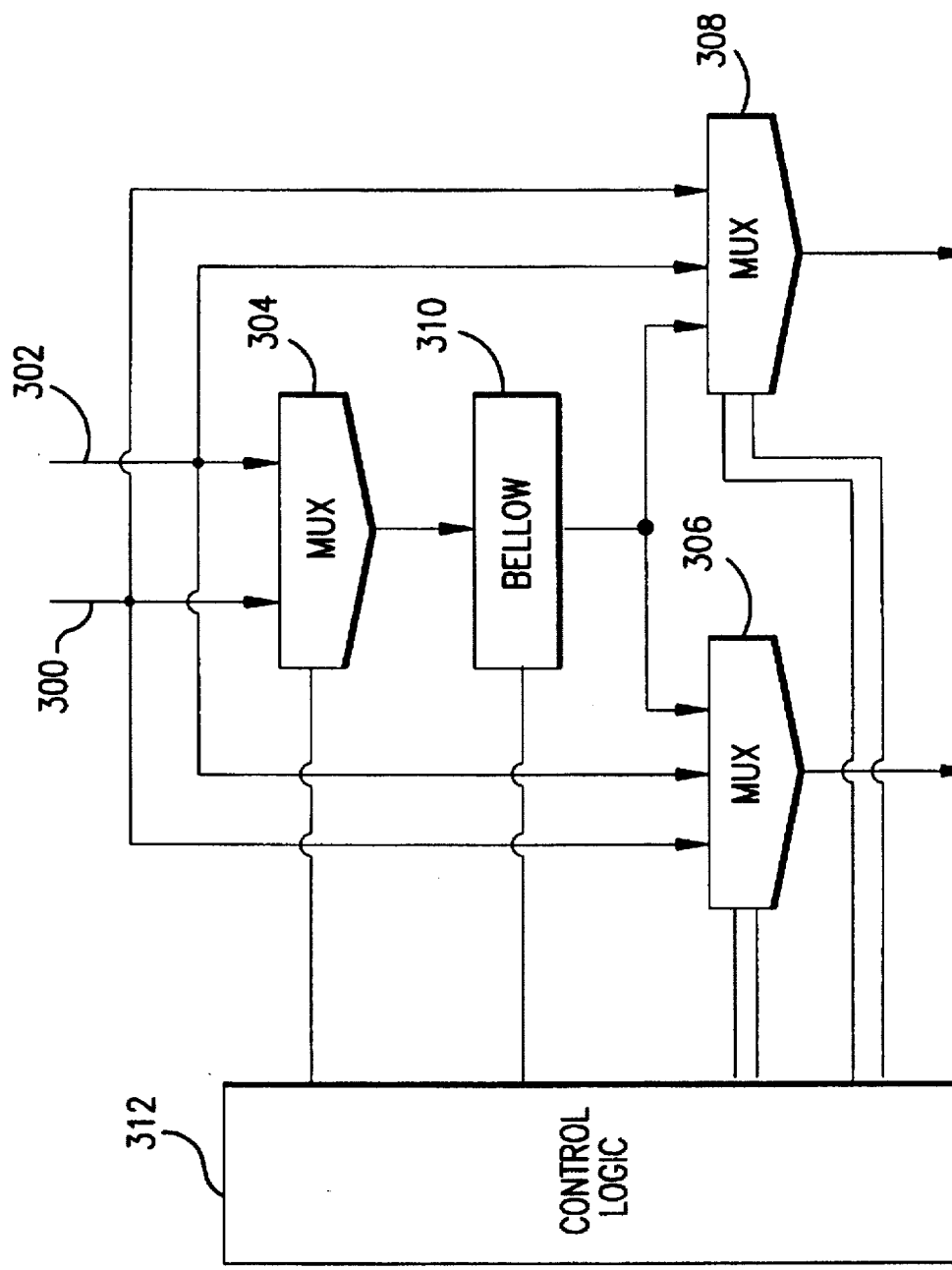
FIG. 3 shows the details of the address bellow logic of the present invention.

FIG. 3 shows the address bellow logic 202 in greater detail. Two data paths, left 300 and right 302 carry memory requests and connect to two inputs of a 2-to-1 multiplexer (MUX) 304 and two inputs of each one of two 3-to-1 MUXes 306 and 308. An output of the 2-to-1 MUX 304 feeds the address bellow 310. The output of the address bellow 310 connects to the third input of each of the MUXes 306 and 308. The outputs of MUXes 306 and 308 connect to the two (even and od) data paths in the cache pipeline. The combination of MUXes 304, 306, and 308 perform the function represented by the crossbar 105 in FIG. 1. The select inputs of MUXes 304, 306 and 308 as well as an enable input of the address bellow 310 connect to control logic 312. The control logic 312 is responsible for selecting the next memory request to issue into the even or odd path through MUXes 306 and 308 and for selecting the next memory request to enter the bellow 310 through MUX 304. The control logic 312 is also responsible for keeping track of whether valid data is travelling through each pipe. In short, it is the control logic 312 that controls the conflict resolution hardware to perform the function described in connection with FIG. 1.

Figure 4:
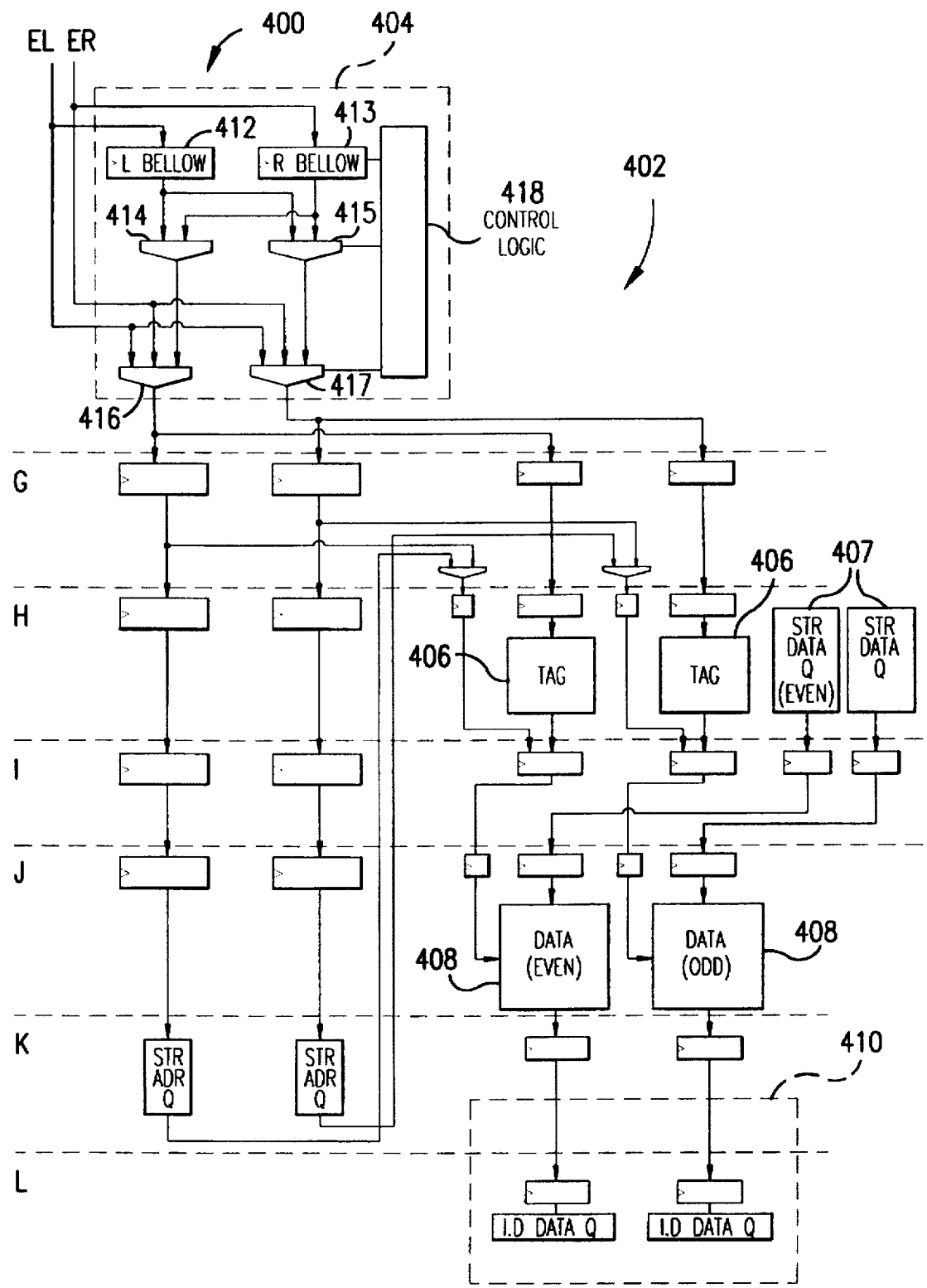
FIG. 4 shows the address bellow and the pipeline stages of the interleaved cache memory in greater detail.

FIG. 4 shows the address bellow and the pipeline stages of the interleaved cache in greater detail. The pipeline includes an address pipe 400 and a memory pipe 402 in parallel. Each pipelined path 400 and 402 divides into an even and an odd (or left and right) pipes. As in FIG. 3, there are five stages, G, H, I, J, and K associated with the cache pipeline. The pipeline operates as follows. By the time the memory requests reach the G stage, the address bellow logic 404 has determined and reordered (if necessary) the odd and even requests. Accordingly, a pair of requests enter the cache pipeline at the G stage where they are registered at both pipes 400 and 402. During the next stage H, in the memory pipe 402, tag memory 406 is accessed and a lookup operation occurs. The results of the lookup are forwarded to the data memory 408 in the next stage I. In case of a write operation, data from the store data queue 407 is written into the accessed location inside the data memory, and in case of a read operation the accessed data is sent to a load data queue 410 in the next stage K. In parallel with the memory pipe 402, the address pipe 400 simply passes pairs of memory requests down the pipe from register to register in each stage. Because in the TFP implementation the tag memory 406 and data memory 408 are on separate chips and the entire cache is external to the floating point and integer execution units, a full cycle is allocated to stages G, I, and K to allow for chip crossings.

The address bellow logic 404 is shown having two bellows 412 and 413. A second bellow is there only to facilitate the implementation of the address bellow logic and does not affect the general single-bellow conflict resolution method as described in connection with FIG. 1. In this implementation, instead of multiplexing one request of the pair of (left and right) requests into a single bellow, the left memory request is loaded onto the left bellow 412 and the right memory request is loaded onto the right bellow 413. A pair of 2-to-1 MUXes 414 and 415 select one of the outputs of the two bellows and feed it to a second set of MUXes 416 and 417. The second set of MUXes 416 and 417 are 3-to-1 MUXes and receive both of the left and right memory requests directly from the pervious stage (E) in the pipeline. The memory requests at the outputs of MUXes 416 and 417 are issued down the even (left) and odd (right) pipes of the address pipe 400, respectively. A bellows control logic 418 controls the select inputs (not shown) of all MUXes as well as enabling the bellows and validating the left and right pipes of the address pipe 400.

The bellows control logic 418 is responsible for selecting and routing the next memory request down the address pipe 400, generating the bellows register enable signals, generating memory request priority, and generating the bellows valid enable signals. The bellows control logic 418 is implemented in hardware which is fully described in hardware description language (HDL). The HDL listing for the bellows logic is included at the end of this description. Employing computer aided design (CAD) tools such as Verilog, designers can fully implement circuitry by defining the logical functions in HDL. A typical HDL file includes definitions and initialization of all parameters followed by a series of logical statements defining the logical functions using the parameters. The CAD tool then automatically generates the logic circuitry based on the HDL file. In the case of the bellows control logic of the present invention, the attached listing includes a Verilog hardware description file that defines the logic for implementing six different possible cases: 1) nothing in the bellows: Bellows=(n,n); 2) a single even request in the bellows: Bellows=(n,ev) or (ev,n); 3) a single odd request in the bellows: Bellow=(n,od) or (od,n); 4) a pair of even and odd requests in the bellows: Bellow= (ev,od) or (od,ev); 5) a pair of even requests in the bellows: Bellows=(ev,ev); and 6) a pair of odd requests in the bellows: Bellows=(od,od).

The logical functions defined by the attached HDL file are described hereinafter for the first one of the six possible cases (bellows empty). The logic takes into account several features that are implementation specific. For example, while priority is determined based on the sequence in which memory requests occur in time, this particular implementation further assigns, arbitrarily, higher priority to the left side over the right side. In the address pipe 400, the left pipe is designated as the even pipe carrying even memory requests and the right pipe as the odd pipe. Also, when the bellows are empty, they are enabled by default to receive the next memory requests regardless of the logical requirement. Because the third input to the 3-to-1 MUXes 416 and 417 goes through the first level of MUXes 414, 415, it is referred to as the "slow" input as compared to the other two inputs that directly connect to the E stage memory requests. The terminology "SLO" is used in parameter definition to refer to this input.

The first part of the file includes definitions of parameters and default initializations. The TFP microprocessor refers to the cache pipeline 204 (FIG. 2) as the global (or G) cache pipeline. Therefore, the letter G used in the following parameter definitions refers to the G pipe, and more specifically to the address pipe 400. Further, the letter E identifies the stage preceding the cache memory first (G) stage. The following is a brief description of the parameters:

Inputs to the bellows control logic:
  EvalL=E stage Left side valid
  EvalR=E stage Right side valid
  EevL=E stage, even, Left
  EevR=E stage, even, Right
  EodL=E stage, odd, Left
  EodR=E stage, odd, Right
  BvalR=Bellow Right side valid
  BevL=Bellow, even, Left
  BevR=Bellow, even, Right
  BodL=Bellow, odd, Left
  BodR=Bellow, odd, Right Outputs of the bellows control logic:
  ElselE=E stage left, select Even pipe
  ErselE=E stage right, select Even pipe
  SLOselE=Slow select Even pipe
  GRQvenbE=G pipe Request valid enable Even pipe
  GRQpriE=G pipe Request priority Even pipe
  ElselO=stage left, select Odd pipe
  ErselO=stage right, select Odd pipe
  SLOselO=Slow select Odd pipe
  GRQvenbO=G pipe Request valid enable Odd pipe
  GRQpriO=G pipe Request priority Odd pipe
  BlselE=Bellow left select Even pipe
  BrselE=Bellow right select Even pipe
  BlselO=Bellow left select Odd pipe
  BrselO=Bellow right select Odd pipe
  BenbL=Left Bellow enable
  nBvenbL=nothing in Bellow, valid enable Left
  BenbR=Right Bellow enable
  nBvenbR=nothing in Bellow, valid enable Right The default initialization for all parameters is set to "FALSE" except for ElselE and ElselO which selects the memory request in the E stage left side (whether odd or even). This is because by default this implementation gives priority to the left side over the right side. This also assumes that the bellows, which have higher priority as compared to the E stage memory requests, are empty. The bellows must have higher priority since a memory request that has been loaded onto either of the bellows is one cycle ahead of current memory requests in the E stage. The syntax for the HDL used in this example includes exclamation mark (!) to represent a logical NOT function, double parallel bars (||) to represent a logical OR, double ampersand (&&) to represent a logical AND, and double slashes (//) to indicate text.

The following analysis of the first condition (bellows empty: Bellows=(n,n)) listed in the attached HDL file provides a better understanding of the above parameter definition and their associated logical functions. Each logical statement is followed by a brief description of its logical operation.

```
//
// Bellows = (n,n)   i.e. nothing in either the left or the
// right bellow.
// if (!BvalL && !BvalR)       // if left and right bellows are not
                                // valid (i.e. are empty) then ElselE
                                // is the default which selects the
                                // memory request from the E stage
                                // left side and issues it down the
                                // even pipe.
      begin
        if ((!EvalL && EvalR) || (EodL && EevR))
           begin
```

```
                                11
              ElselE = 'FALSE;  // reset default assignment;
              ErselE = 'TRUE;   // select the E stage right side
                                // to issue request down the
                                // even pipe;
        end
//
// if E stage left side is not valid and E stage right side is
// valid (i.e. no request coming down the E stage left side
// but a request is coming down the E stage right side), OR if
// E stage left side contains an odd memory request and E
// stage right side an even memory request, then reset the
// default assignment so that instead of the E stage left
// side, the request in the E stage right side issues down the
// even pipe of the address pipe 400;
//
        if (EevL ‖ EevR) GRQvenbE = 'TRUE;
//
// if the E stage left side contains an even memory request or
// E stage right side contains an even memory request, then
// enable the even (left) pipe valid signal (i.e. validate
// memory request down the left pipe of the address pipe 400);
//
        if ((EevL && EodR) ‖ (!EvalL && EvalR))
           begin
              ElselO = 'FALSE;  // reset default assignment;
              ErselO = 'TRUE;   // select the E stage right side
                                // to issue request down the odd
                                // pipe;
        end
//
// if the E stage left side contains an even request and E
// stage right side an odd request, or if E stage left side is
// not valid (i.e. contains no request) and E stage right side
// is valid, then reset the default assignment so that instead
// of the E stage left side, the request in the E stage right
// side issues down the odd pipe of the address pipe 400;
//
        if (EodL ‖ EodR) GRQvenbO = 'TRUE;
//
// if the E stage left side contains an odd memory request or
// E stage right side contains an odd memory request, then
// enable the odd (right) pipe valid signal (i.e. validate
// memory request down the right pipe of the address pipe
// 400);
//

// Priority selection
//
        if (EevL ‖ (!EvalL && EevR)) GRQpriE = "TRUE;
//
// if the E stage left side contains an even address OR the E
// stage left side is not valid (no request) and E stage right
// side contains an even request, then priority is given to
// the request down the even pipe;
//
        if (EodL ‖ (!EvalL && EodR)) GRQpriO = 'TRUE
//
```

```
            // if the E stage left side contains an odd address OR the E
            // stage left side is not valid (no request) and E stage right
            // side contains an odd request, then priority is given to the
            // request down the odd pipe;
 5          //

// Bellows enable signals
            //
                    if (EvalL) BenbL = 'TRUE;
10          //
            // since the bellows are empty, if the E stage left side is
            // valid (i.e. contains a memory request) then enable the left
            // bellow (i.e. load the request into the left bellow 412 by
            // default);
15          //
                    if (EvalR) BenbR = 'TRUE;
            //
            // if the E stage right side is valid (i.e. contains a memory
            // request) then enable the right bellow (i.e. load the
20          // request into the right bellow 413);
            //
                    if ((EevL && EevR) | (EodL && EodR)) nBvenbR = 'TRUE;
            //
            // if both the left and the right side of the E stage contain
25          // even requests, OR both the left and the right sides of the
            // E stage contain odd requests, since the left side is given
            // priority over the right side, then the empty right bellow
            // is loaded;
            //
30                  end
            end
```

The preceding case analysis covers all possibilities for the condition where both bellows are empty. The other five cases included in the following HDL file can be analyzed in a similar fashion.

```
                                            13
         //////////////////////////////////////////////////////////
         //         Selection priority is as follows:
         //
         //                 Bl
5        //                 Br
         //                 El
         //                 Er
         //////////////////////////////////////////////////////////
10       function [19:0] DIctrl;

input           EvalL, EvalR, EevL, EevR, EodL, EodR,
                         BvalL, BvalR, BevL, BevR, BodL, BodR;

15       reg             ElselE, ErselE, SLOselE, GRQvenbE, GRQpriE,
                         ElselO, ErselO, SLOselO, GRQvenbO, GRQpriO,
                         BlselE, BrselE,
                         BlselO, BrselO,
                         BenbL, nBvenbL,
20                       BenbR, nBvenbR;

begin

25                   // default initialization
                     //
                         ElselE = 'TRUE;
                         ElselO = 'TRUE;

30                          ErselE = 'FALSE;
                           SLOselE = 'FALSE;
                          GRQvenbE = 'FALSE;
                           GRQpriE = 'FALSE;
                            ErselO = 'FALSE;
35                         SLOselO = 'FALSE;
                          GRQvenbO = 'FALSE;
                           GRQpriO = 'FALSE;
                            BlselE = 'FALSE;
                            BrselE = 'FALSE;
40                          BlselO = 'FALSE;
                            BrselO = 'FALSE;
                             BenbL = 'FALSE;
                           nBvenbL = 'FALSE;
                             BenbR = 'FALSE;
45                         nBvenbR = 'FALSE;
         //
```

14

```
///////////////////////////////////////////////////////////////
//        Case 1: Bellows = (n,n)
///////////////////////////////////////////////////////////////
if (!BvalL && !BvalR)
   begin // Gpipe-even select
           //
           // ElselE is the default selection !!!!

if ((!EvalL && EvalR) || (EodL && EevR))
             begin
                ElselE = 'FALSE;   // reset default assignment
                     ErselE = 'TRUE;
                end if (EevL || EevR) GRQvenbE = 'TRUE;

// Gpipe-odd select
           //
           if ((EevL && EodR) || (!EvalL && EvalR))
                begin
                   ElselO = 'FALSE; // reset default assignment
                   ErselO = 'TRUE;
                   end if (EodL || EodR) GRQvenbO = 'TRUE;

// Priority select
           //
           if (EevL || (!EvalL && EevR)) GRQpriE = 'TRUE;
           if (EodL || (!EvalL && EodR)) GRQpriO = 'TRUE;

//   Bellows enables
           //
           if (EvalL) BenbL = 'TRUE;
           if (EvalR) BenbR = 'TRUE;

if ((EevL && EevR) || (EodL && EodR)) nBvenbR='TRUE;

end //case
```

```
                                  15
///////////////////////////////////////////////////////////
//    Case 2:    Bellows = (n,ev) or (ev,n)
///////////////////////////////////////////////////////////
if ((!BvalL && BevR) || (BevL && !BvalR))
    begin // Gpipe-even select
            // Request is unconditionally coming from Bellows
            // remember, ElselE is the default
            //
            ElselE  = 'FALSE;       // reset default assignment
            SLOselE = 'TRUE;

if (BevR)
                 BrselE = 'TRUE;
            else BlselE = 'TRUE;

GRQvenbE = 'TRUE;              // dispatching a even
                                           // from the Bellows // Gpipe-odd select
            //
            if (EodL || (!EvalL && EodR))
                 begin
                      GRQvenbO = 'TRUE;
                      ElselO = 'FALSE; // reset default assignment
                 end if (EodL) ElselO = 'TRUE;
      if (!EvalL && EodR) ErselO = 'TRUE;

// Gev is always the highest priority request
            //
            GRQpriE = 'TRUE;
            GRQpriO = 'FALSE;

// Bellows enables
            //
            if    (EvalL) BenbL = 'TRUE;
            if    (EvalR) BenbR = 'TRUE;

if    (EevL) nBvenbL = 'TRUE;    // always valid except
                                             // when pair with
      Bellows
            if    (EvalR && !(!EvalL && EodR)) nBvenbR = 'TRUE;
            // always valid except when pair with bellows end //case
```

```
////////////////////////////////////////////////////////////
//   Case 3:     Bellows = (n,od) or (od,n)
////////////////////////////////////////////////////////////
if (((!BvalL && BodR)  ||  (BodL && !BvalR))
    begin
        // Gpipe-even  select
        //
        if (!EvalL && EevR)
            begin
                ElselE  = 'FALSE; // reset default assignment
                SLOselE = 'FALSE;
                ErselE  = 'TRUE;
                GRQvenbE = 'TRUE;
            end if (EevL) GRQvenbE = TRUE; //this catches all other
                                  // cases // Gpipe-odd select
        if (BodR)
            begin
                ElselO  = 'FALSE;// reset default assignment
                SLOselO = 'TRUE;
                BrselO  = 'TRUE;
            end if (BodL)
        begin
            ElselO  = 'FALSE; // reset default assignments
            SLOselO = 'TRUE;
            BlselO  = 'TRUE;
        end GRQvenbO = 'TRUE;    // always dispatching to Gpipe-odd
                         // from the bellows //Priority select
  GRQpriE = 'FALSE;
  GRQpriO = 'TRUE;

// Bellows enables
//
if (EvalL) BenbL = 'TRUE;
if (EvalR) BenbR = 'TRUE;

if (EodL) nBvenbL 'TRUE;
if (EvalR && !(!EvalL && EevR)) nBvenbR 'TRUE;

end //case
```

```
//////////////////////////////////////////////////////////////
//    Case 4: Bellows = (ev,od) or (od,ev)
////////////////////////////////////////////////////////////// if ((BevL BodR) || (BodL && BevR))
      begin
         // Gpipe-even select
         if (BevL)
            begin
               ElselE = 'FALSE;        // reset default assignment
               SLOselE = 'TRUE;
               BlselE = 'TRUE;
               GRQvenbE = 'TRUE;
            end if BevR
            begin
               ElselE = 'FALSE; // reset default assignment
               SLOselE = 'TRUE;
               BrselE = 'TRUE;
               GRQvenbE = 'TRUE;
            end
         // Gpipe-odd select
         if (BodL)
            begin
               ElselO = 'FALSE;        // reset default assignment
               SLOselO = 'TRUE;
               BlselO = 'TRUE;
               GRQvenbO = 'TRUE;
            end if BodR
            begin
               ElselO = 'FALSE;        // reset default assignment
               SLoselO = 'TRUE;
               BrselO = 'TRUE;
               GRQvenbO = 'TRUE;
            end
         // Priority select; Bl always has higher priority
         if (BevL) GRQpriE = 'TRUE;
         if (BodL) GRQpriO = 'TRUE;
         // Bellows enables
         if (EvalL)
            begin
               BenbL = 'TRUE;
               nBvenbL = 'TRUE;
            end if (EvalR)
            begin
               BenbR = 'TRUE;
               nBvenbR = 'TRUE;
            end end // case
```

18

```
//////////////////////////////////////////////////////////
//   Case 5:    Bellows = (ev,ev)
//////////////////////////////////////////////////////////
///
// There is never a valid memory request dispatched
// to Gpipe-odd
//
if (BevL && BevR)
    begin // Gpipe-even select
        // dispatch from B1
        //
        ElselE = 'FALSE;        // reset default assignment
        SLOselE = 'TRUE;
        B1selE = 'TRUE;
        GRQvenbE = 'TRUE;       // always dispatch to Gpipe-even // Note: Gpipe-odd select will use the default assignment
        //       with valid-enable reset // Priority select
        // B1 is always highest priority
        //
        GRQpriE = 'TRUE;
        GRQpriO = 'FALSE;

// Bellows enables
        // invalidate B1
        //
        nBvenbL = 'FALSE;   // B1 was dispatched to the Gpipe
        nBvenbR = 'TRUE;

end //case
```

```
                                    19
//////////////////////////////////////////////////////////
//   Case 6:    Bellows = (od,od)
//////////////////////////////////////////////////////////
// There is never a valid request dispatched to Gpipe-even
//
     if (BodL && BodR)
         begin // Gpipe-even select
             // dispatch from Bl
             //
                ElselO = 'FALSE; // reset default assignment
                SLOselO = 'TRUE;
                BlselO = 'TRUE;
                GRQvenbO = 'TRUE;// always dispatch to Gpipe-odd // Note: Gpipe-even select will use the default
             //       assignment with valid-enable reset // Priority select
             // Bl is always highest priority
             //
                GRQpriE = 'FALSE;
                GRQpriO = 'TRUE;

// Bellows enables
             // invalidate  Bl
             //
                nBvenbL = 'FALSE;//Bl was dispatched to the Gpipe
                nBvenbR = 'TRUE;

end //case

//////////////////////////////////////////////////////////
     DIctrl = (
                    ElselE, ErselE, SLOselE, GRQvenbE,
          GRQpriE,
                    ElselO, ErselO, SLOselO, GRQvenbO,
                    GRQpriO,
                    BlselE, BrselE,
                    BlselO, BrselO,
                    BenbL, nBvenbL,
                    BenbR, nBvenbR
                    );

end // DIctrl
endfunction // DIctrl

//////////////////////////////////////////////////////////
```

In conclusion, the present invention provides a conflict resolution system for interleaved memories in processors that are capable of issuing more than one memory operation per cycle. The conflict resolution system includes an address bellow, multiplexers and control logic to assist the processor in reordering the address mix to avoid conflicts. While the above is a complete description of the preferred embodiment and a representative implementation of the present invention, it is possible to use various alternatives, modifications and equivalents. For example, the address bellow may be designed to have a longer queue than one. Also, the memory system may have a higher degree of interleaving (i.e more than two banks). Therefore, the scope of the present invention should be determined not with reference to the above description but should, instead, be determined with reference to the appended claims, along with their full scope of equivalents.

What is claimed is:

1. In a processor capable of issuing more than one memory operation per cycle and having an interleaved memory system with a plurality of pipelined memory banks, a memory request conflict resolution system comprising:
   a cross-connect switch for routing at least one memory request to at least one of the plurality of banks;
   an address register coupled to the cross-connect switch for temporarily storing a selected memory request; and
   control logic coupled to the cross-connect switch and the address register to reorder a sequence of memory requests to maximize the occurrence of alternating memory bank requests to avoid bank request conflicts in the same cycle,
   wherein, the reordering maintains priority of memory requests as originally assigned by a single instruction stream, and
   wherein, the pipelined memory banks allow each memory bank to be accessed once per cycle, eliminating a bank busy condition.

2. The memory request conflict resolution system of claim 1 wherein the processor is a pipelined superscalar processor and the interleaved memory system is a pipelined cache memory.

3. The memory request conflict resolution system of claim 1 wherein the cross-connect switch comprises a plurality of multiplexers for receiving memory requests and routing memory requests to the address register or the plurality of banks in response to the control logic.

4. In a pipelined superscalar processor capable of processing two operations per cycle in a left and a right pipe and having an interleaved memory having a first and a second bank, a conflict resolution system for the interleaved memory comprising:
   a bellow multiplexer having an output and two inputs coupled to receive memory requests from the left and the right pipe, respectively;
   an address bellow having an input coupled to the bellow multiplexer output, and an output;
   a first bank multiplexer having three inputs for receiving memory requests from the left and the right pipes and the address bellow output respectively, and an output coupled to the first memory bank;
   a second bank multiplexer having three inputs for receiving memory requests from the left and the right pipes and the address bellow output respectively, and an output coupled to the second memory bank; and
   control logic coupled to the bellow multiplexer, the address bellow, the first bank multiplexer and the second bank multiplexer for controlling the system to route even and odd memory requests in each cycle.

5. A memory request conflict resolution circuit for an interleaved memory system having a plurality of pipelined memory banks and capable of processing two memory requests per cycle, the conflict resolution circuit comprising:
   a cross-connect switch for routing at least one memory request to at least one of the plurality of banks;
   an address register coupled to the cross-connect switch for temporarily storing a selected memory request; and
   control logic coupled to the cross-connect switch and the address register for reordering a sequence of memory requests to maximize the occurrence of alternating memory bank requests to avoid bank request conflicts in the same cycle,
   wherein, the reordering maintains priority of memory requests as originally assigned by a single instruction stream, and
   wherein, the pipelined memory banks allow each memory bank to be accessed once per cycle, eliminating a bank busy condition.

6. The memory request conflict resolution circuit of claim 5 wherein the cross-connect switch comprises a plurality of multiplexers for receiving memory requests and routing memory requests to the address register or the plurality of banks in response to the control logic.

7. A pipelined processor including:
   an integer pipeline generating a pair of memory requests per cycle from a single instruction stream;
   a conflict resolution network coupled to simultaneously receive the pair of memory requests;
   a two-way interleaved pipelined cache memory having an even and an odd pipe coupled to the conflict resolution network;
   a first and second load register queue coupled to an output of the even pipe and the odd pipe, respectively; and
   a floating point pipeline coupled to the first and second load register queues,
   wherein, the conflict resolution network comprises:
     an input multiplexer coupled to receive the pair of memory requests;
     a hold register coupled to an output of the input multiplexer;
     an even pipe multiplexer having a first and second inputs coupled to the pair of memory requests, respectively, a third input coupled to an output of the hold register, and an output coupled to the even pipe of the two-way interleaved pipelined cache memory;
     an odd pipe multiplexer having a first and second inputs coupled to the pair of memory requests, respectively, a third input coupled to the output of the hold register, and an output coupled to the odd pipe of the two-way interleaved pipelined cache memory; and
     control logic coupled to the input multiplexer, the hold register, and the even pipe and odd pipe multiplexers, for controlling the network to maximize the occurrence of alternating memory bank requests per cycle,
   wherein, the control logic maintains priority of memory requests as originally assigned by the single instruction stream, and
   wherein, the two-way interleaved pipelined cache memory allows each memory bank to be accessed once per cycle, eliminating a bank busy condition.

* * * * *